United States Patent [19]

Dahinden

[11] 4,213,354
[45] Jul. 22, 1980

[54] METHOD AND MEANS FOR COOLING DOWN A STATIONARY TWIST DRILL BY A COOLANT

[75] Inventor: Walter Dahinden, Port, Switzerland

[73] Assignee: Dornag, Berne, Switzerland

[21] Appl. No.: 940,298

[22] Filed: Sep. 6, 1978

[30] Foreign Application Priority Data

Sep. 15, 1977 [CH] Switzerland ............... 11319/77

[51] Int. Cl.² ................ B23B 1/00; B23B 27/10
[52] U.S. Cl. .................... 82/1 C; 82/34 R; 82/DIG. 1; 407/11; 408/61
[58] Field of Search ......... 82/1 C, 34 R, DIG. 1; 408/56, 61; 279/1 ME; 407/11

[56] References Cited

U.S. PATENT DOCUMENTS

| 2,857,166 | 10/1958 | Conn et al. ............ 279/1 ME |
| 3,868,195 | 2/1975 | Anderson et al. ............ 408/61 |

FOREIGN PATENT DOCUMENTS 7142071 10/1972 Fed. Rep. of Germany .

| 1313297 | 4/1973 | United Kingdom ............ 408/61 |
| 565808 | 7/1977 | U.S.S.R. ............ 408/61 |

OTHER PUBLICATIONS

American Machinist, Pub. Jun. 1, 1970 pp. 112 left column.

Primary Examiner—Leonidas Vlachos
Attorney, Agent, or Firm—Oblon, Fisher, Spivak, McClelland & Maier

[57] ABSTRACT

Coolant is supplied through a main delivery line and a conduit bored in the toolholder by coolant pumps. The coolant then enters into a ring having two opposite ball jets from which it is simultaneously conveyed in two concentrated streams on to both the grooves of the twist drill. Each of the streams of the coolant is directed at the respective beginning portions of the grooves. The ring is rotatably set up on the toolholder and is adjustable in the required position. The ball jets are swingable and securable in the required position in the ring by retaining screws.

5 Claims, 4 Drawing Figures

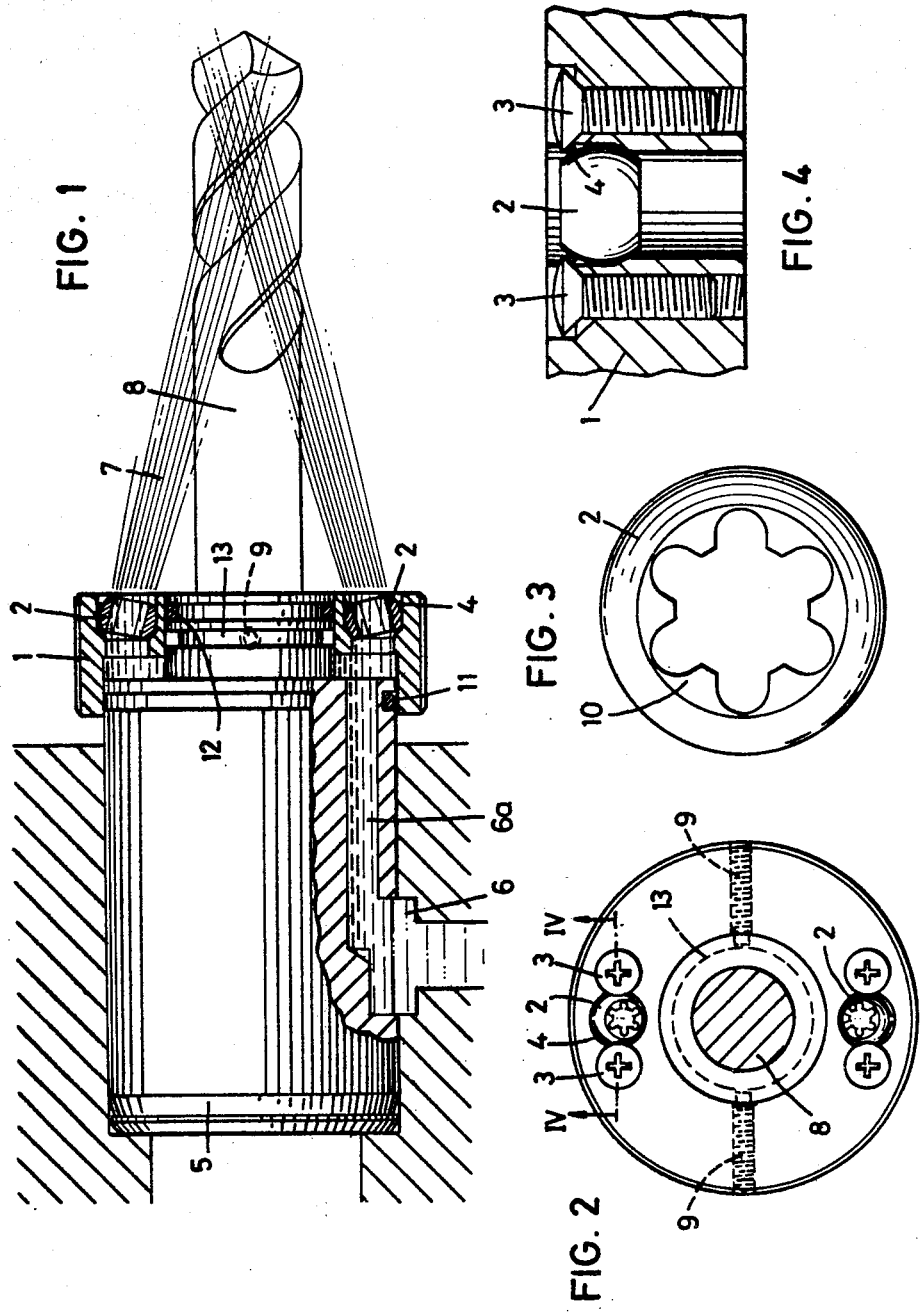

METHOD AND MEANS FOR COOLING DOWN A STATIONARY TWIST DRILL BY A COOLANT

BACKGROUND OF THE INVENTION

1. Field of the Invention

The invention relates to method for cooling down a twist drill on a toolholder, which drill remains stationary during the working process, a coolant being supplied on said drill through a conduit bored in the toolholder, and a means for performing the method.

2. Description of the Prior Art

The cutting motion on a lathe, especially a numerically controlled lathe, is done by a rotary work-piece while the twist drill retained within the toolholder of the lathe remains stationary. It has been known to cool down the twist drills of this kind during the working process in such a way that the drill is flooded with coolant supplied through a coolant delivery line which is separated from the drill. It has also been known to spray the twist drill by a stream of coolant emerging from a single jet arranged in the toolholder. In both the cases coolant delivered to the twist drill has been under pressure.

The above-mentioned known methods for cooling down a twist drill which remains stationary during the working process are disadvantageous because not necessarily the whole surfaces of both the grooves of the twist drill are simultaneously and adequately flooded with coolant. Moreover, the stream of coolant supplied to the twist drill through a known jet having a smooth bore is not concentrated, which is especially disadvantageous with twist drills having a length of more than 200 mm.

It is desirable to do away with the disadvantages of the known methods for cooling down a twist drill and the known means used to perform such methods and to propose a method and a means for cooling down a twist drill which remains stationary during the working process which would allow both the grooves of the twist drill to be simultaneously and adequately sprayed with coolant all over their entire length, whereby twist drills having a length of more than 200 mm should also be effectively cooled down.

SUMMARY OF THE INVENTION

The object of invention is achieved in such a way that coolant is supplied under pressure through two jets in two simultaneous concentrated streams separate from each other on to both the grooves of the twist drill, each of the streams of coolant being directed at the respective beginning of the grooves and initially limited to the respective beginning of the grooves.

The means to perform the method is characterized in that the ring is rotatably adjustable in the required position on the toolholder and has a front side in which two opposite ball jets for delivering each a concentrated stream of coolant on the respective groove of the twist drill are inserted, the ball jets being swingable or rotatable and secured in the required position by retaining screws.

It is advantageous to provide the profile of the jet bore in the form of a rosette and the ratio between the diameter and the length of the jet bore as being approximately 1:1.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:, FIG. 1 is an elevational view of a twist drill retained within a toolholder shown partially in section, and a means for cooling down the twist drill, the front side of such means facing the twist drill, FIG. 2 is a front elevational view of the means for cooling down the twist drill according to FIG. 1, FIG. 3 is a front elevational view of a ball jet according to FIGS. 1 and 2 on an enlarged scale, and FIG. 4 is a view in section taken along the line IV-IV of FIG. 2.

DETAILED DESCRIPTION OF THE PREFERRED EMBODIMENTS

The toolholder 5 shown in FIG. 1 which is received in a tool receiving device has a conduit 6a bored in its body running parallel to its longitudinal axis. The conduit 6a is connected at one end to a main delivery line 6 of coolant 7 and at its other end to a discharge opening placed on the front side of the toolholder 5. The twist drill 8 is retained with its shaft within the toolholder 5. On the one end of the toolholder 5 lying next to the twist drill 8 there is rotatably set up a ring 1 having a front side; the front side of the ring 1 facing the twist drill 8.

The ring 1 set up on the toolholder 5 is sealed by rubber rings 11, 12 provided in the toolholder 5. As it can be seen in FIGS. 1-4, the ring 1 has two opposite stop screws 9 by means of which it can be stopped in its rotary movement around the longitudinal axis of the toolholder 5 in the desired position in a groove 13 of the toolholder 5. In the front side of the ring 1 there are inserted two ball jets 2 which are capable of swivelling and are countersunk with regard to the surface of this front side. The required position of the ball jets 2 can be fixed by means of two countersunk screws 3 and a slit steel ring 4.

As is evident from FIG. 3, the profile 10 of the bore of the ball jet 2 has the shape of a rosette. The profile of the jet bore can also have another form. The preferred profile 10 of the jet bore having the shape of a rosette ensures that the main volume of the coolant emerging from the jet 2 remains on the circumference of the jet bore and only a part thereof flows into the inside space of the bore. In this way rotation of the stream of coolant will be considerably reduced. Owing to its form described above the ball jet 2 can be swivelled in the bore in the front side of the ring 1 to a certain degree; it can be fixed in the required position by means of the countersunk screws 3 and the slit steel ring 4. It is countersunk with regard to the surface of the front side of the ring 1. The ball jet 2 is so prevented from being displaced by chips springing out from a work-piece not shown during the working process. The screws 3 are equally countersunk with regard to the surface of the front side of the ring 1 as can be best seen from FIG. 3. The ratio diameter/length of the jet bore is approximately 1:1. The coolant 7 is supplied through the main delivery line 6 and the conduit 6a bored in the toolholder 5 by coolant pumps (not shown). The coolant 7 then enters into a chamber provided by the set-up ring 1 on the front side of the toolholder 5 from where it is simultaneously conveyed to both the ball jets 2. The ball jets 2 are adjusted in such a way that each stream of coolant emerging from them is directed to the respective beginning of the grooves of the twist drill 8. The two concentrated streams of coolant which are separate from each other are simultaneously directed under pressure on each groove of the twist drill 8. The profiles of the jet bores serve to calm the streams of the coolant. When the diameter of these bores is divided into several ducts having e.g. a diameter of 2 mm, the stream will be calmed and concentrated. Twist drills having a length of more than 200 mm can be sprayed with such concentrated streams of coolant on both their grooves. As the position of the beginning of each groove of the twist drill is not normalized or aligned with regard to its shaft, the ring 1 with the ball jets 2 has to be adjusted by rotation on the toolholder 5 so that the streams of the coolant 7 emerging from the jets could be first directed against the respective beginning of the grooves of the twist drill 8. As mentioned above, the ring 1 will be secured in the required position on the toolholder 5 by means of the stop screws 9.

The above described means guarantee abundant cooling of a twist drill which remains stationary during the working process.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for cooling down a twist drill having a plurality of grooves formed therein on a toolholder, which drill remains stationary during the working process, coolant being supplied onto said drill through a conduit bored in said toolholder and through a plurality of jets, mounted on a rotatable ring disposed on said toolholder, which comprises:

adjusting said rotatable ring so as to align said plurality of jets so as to correspond to said plurality of grooves;

supplying the coolant under pressure through said plurality of jets in a plurality of simultaneous concentrated streams separate from each other onto the plurality of grooves of said twist drill;

directing each of said streams of coolant at respective beginning portions of said plurality of grooves; and initially limiting application of said streams of coolant to said respective beginning portions of said plurality of grooves.

2. A machine tool cooling assembly comprising:

a toolholder for holding a twist drill having a plurality of grooves formed therein;

a ring member rotatably mounted on said toolholder adjacent said twist drill;

a plurality of jets swivelably mounted on said rotatable ring member;

coolant supply means communicating with said plurality of jets such that coolant is directed by said jets at respective beginning portions of said plurality of grooves and means mounted on said ring member for securing said plurality of jets in a predetermined position, said ring member including a countersunk portion and said means for securing said plurality of jets comprising a second ring member abutting each of said plurality of jets and securing members engaging said second ring member, said second ring member and said securing members being positioned within said countersunk portion of said ring member.

3. A machine tool cooling assembly as set forth in claim 1, said securing members comprising screws.

4. A machine tool cooling assembly as set forth in claim 1, each of said plurality of jets having a bore formed therein and having a shape such that the main volume of coolant emerging from each of said plurality of jets remains on the circumference of said bore of each of said plurality of jets.

5. A machine tool cooling assembly as set forth in claim 1, each of said plurality of jets having a bore formed therein wherein the ratio of the diameter to the length of the bore of each of said plurality of jets is approximately 1:1.

* * * * *